US008655065B2

(12) United States Patent
Sumi et al.

(10) Patent No.: US 8,655,065 B2
(45) Date of Patent: Feb. 18, 2014

(54) IMAGE PROCESSING DEVICE USING ADDING MODULE FOR ADDING ERROR DIFFUSION VALUE OR ERROR DIFFUSION SEED

(75) Inventors: Naoki Sumi, Hyogo (JP); Yoshikazu Matsui, Hyogo (JP); Satoshi Kawata, Hyogo (JP); Masahiro Yoshiga, Hyogo (JP)

(73) Assignee: Chimei Innolux Corporation, Miaoli County (TW)

( * ) Notice: Subject to any disclaimer, the term of this patent is extended or adjusted under 35 U.S.C. 154(b) by 666 days.

(21) Appl. No.: 12/904,690

(22) Filed: Oct. 14, 2010

(65) Prior Publication Data

US 2012/0093430 A1 Apr. 19, 2012

(51) Int. Cl.
*G06K 9/00* (2006.01)
*G06K 15/00* (2006.01)

(52) U.S. Cl.
USPC ............................ 382/167; 382/252; 358/3.03

(58) Field of Classification Search
None
See application file for complete search history.

(56) References Cited

U.S. PATENT DOCUMENTS

| | | | | | |
|---|---|---|---|---|---|
| 5,034,990 | A | * | 7/1991 | Klees | 382/252 |
| 5,153,925 | A | * | 10/1992 | Tanioka et al. | 382/272 |
| 5,313,287 | A | * | 5/1994 | Barton | 382/252 |
| 5,363,209 | A | * | 11/1994 | Eschbach et al. | 358/445 |
| 5,454,052 | A | * | 9/1995 | Kojima | 382/233 |
| 5,610,999 | A | * | 3/1997 | Bannai et al. | 382/272 |
| 5,712,927 | A | * | 1/1998 | Kim et al. | 382/252 |
| 5,990,855 | A | * | 11/1999 | Kobayashi et al. | 345/88 |
| 6,041,139 | A | * | 3/2000 | Okubo et al. | 382/199 |
| 6,671,068 | B1 | * | 12/2003 | Chang et al. | 358/1.9 |
| 6,795,581 | B1 | * | 9/2004 | Nomura | 382/232 |
| 2001/0021035 | A1 | * | 9/2001 | Takashimizu | 358/1.9 |
| 2006/0152763 | A1 | * | 7/2006 | Chen et al. | 358/3.03 |
| 2008/0218803 | A1 | * | 9/2008 | Murakami | 358/3.01 |
| 2009/0034004 | A1 | * | 2/2009 | Nakamura | 358/3.03 |

FOREIGN PATENT DOCUMENTS

| | | | | | |
|---|---|---|---|---|---|
| JP | 07322259 | A | * | 12/1995 | H04N 7/30 |
| JP | 08101663 | A | * | 4/1996 | G09G 3/20 |
| JP | 2001136388 | A | * | 5/2001 | H04N 1/405 |
| JP | 2004040611 | A | * | 2/2004 | H04N 1/405 |

* cited by examiner

*Primary Examiner* — Wenpeng Chen
(74) *Attorney, Agent, or Firm* — Muncy, Geissler, Olds & Lowe, P.C.

(57) ABSTRACT

An image processing device comprises a halftoning module, a detecting module, an adding module and a generating module. The halftoning module generates an error diffusion value. The detecting module detects an edge at a current pixel of an image. The adding module adds the pixel value of the current pixel with one of the error diffusion value and an error diffusion seed according to the detecting result. The generating module generates the error diffusion seed. The error diffusion seed is generated by a formula based on the pixel value and location of the current pixel and a random number, or the error diffusion seed is generated by a formula based on the pixel value of the current pixel and a looked-up value, and the looked-up value is retrieved from a look-up table according to the location of the current pixel.

16 Claims, 13 Drawing Sheets

| PV  | 184   | 185    | 186    | 187    | 188    | 189    | 190    | ... |
|-----|-------|--------|--------|--------|--------|--------|--------|-----|
| GCV | 0.482 | 0.4878 | 0.4936 | 0.4995 | 0.5054 | 0.5114 | 0.5174 | ... |

FIG. 3A

| PV  | 184   | 185    | 186  | 187 | 188  | 189    | 190    | ... |
|-----|-------|--------|------|-----|------|--------|--------|-----|
| GCV | 0.482 | 0.4878 | 0.49 | 0.5 | 0.51 | 0.5114 | 0.5174 | ... |

FIG. 3B

| PV  | 184   | 185  | 186 | 187 | 188 | 189  | 190    | ... |
|-----|-------|------|-----|-----|-----|------|--------|-----|
| GCV | 0.482 | 0.49 | 0.5 | 0.5 | 0.5 | 0.51 | 0.5174 | ... |

FIG. 3C

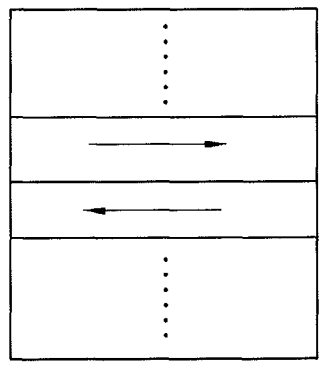
FIG. 4
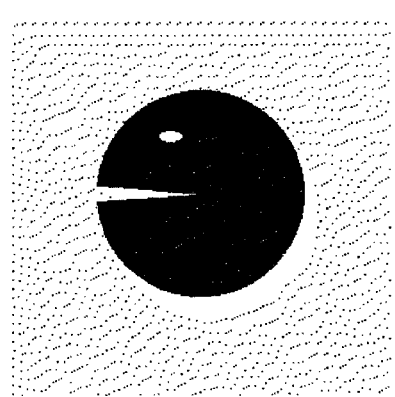 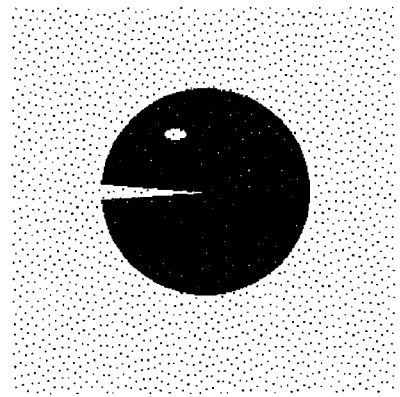
FIG. 5A  FIG. 5B

Ma: first sequence
Mb: second sequence k=0  | 0 | k=1  Ma Mb
     | 0 | 1 | k=2  Ma      Mb
     | 0 | 2 | 1 | 3 | k=3       Ma              Mb
     | 0 | 4 | 2 | 6 | 1 | 5 | 3 | 7 | k=4            Ma                          Mb
     | 0 | 8 | 4 | 12 | 2 | 10 | 6 | 14 | 1 | 9 | 5 | 13 | 3 | 11 | 7 | 15 |

⇩ +1

| 1 | 9 | 5 | 13 | 3 | 11 | 7 | 15 | 2 | 10 | 6 | 14 | 4 | 12 | 8 | 16 | combined sequence

IMAGE PROCESSING DEVICE USING ADDING MODULE FOR ADDING ERROR DIFFUSION VALUE OR ERROR DIFFUSION SEED

BACKGROUND OF THE INVENTION

1. Field of Invention

The present invention relates to a processing method and device for an image, and, in particular, to a processing method and device for a halftone image.

2. Related Art

Digital halftone technology is an image processing method which simulates a continuous tone image by varying dots in size or in spacing. Adding additional noise and error diffusion are two commonly used methods in the digital halftone technology.

Adding additional noise is to add noise into images before quantization. The added noise can destroy the monotony resulted from the fixed gray level, such that the halftone image can be similar to the original image.

Error diffusion is another way of halftoning in which the quantization residual is distributed to neighboring pixels that have not yet been processed. The halftone image that is processed with the error diffusion is better than that of dithering in quality. However, the error diffusion method may cause the worms in images and requires significant computational resources to implement.

Moreover, the conventional halftoning technology has a problem of "start-up delay" occurred near edges or boundaries of the image. This is because that the gray values of several initial pixels are lower than the error diffusion threshold value such that no dots are added into the image.

Therefore, it is an important object to provide a processing method and device for fast halftoning image and providing good image quality.

SUMMARY OF THE INVENTION

In view of the foregoing, the present invention is to provide a processing method and device which can generate halftoned image with better image quality.

To achieve the above, a processing method for an image includes the step of generating an error diffusion value; detecting an edge at a current pixel of the image; and adding the pixel value of the current pixel with one of the error diffusion value and an error diffusion seed according to the detecting result.

In addition, the present invention also discloses a processing device for an image, which includes a halftoning module, a detecting module and an adding module. The halftoning module generates an error diffusion value. The detecting module detects an edge at a current pixel of the image. The adding module adds the pixel value of the current pixel with one of the error diffusion value and an error diffusion seed according to the detection.

In addition, the present invention also discloses a display apparatus including a processing device for an image and a displaying device. The processing device has a halftoning module, a detecting module and an adding module. The halftoning module generates an error diffusion value. The detecting module detects an edge at a current pixel of the image. The adding module adds the pixel value of the current pixel with one of the error diffusion value and an error diffusion seed according to the detecting result. The displaying device displays the image processed by the processing device.

As described above, the pixel value may be added with an error diffusion value generated by the error diffusion or added with an error diffusion seed generated by other methods. Therefore, it can generate the halftoned image with better image quality.

BRIEF DESCRIPTION OF THE DRAWINGS

The invention will become more fully understood from the detailed description and accompanying drawings, which are given for illustration only, and thus are not limitative of the present invention, and wherein:

FIGS. 3A to 3C are schematic diagrams illustrating the gamma correction table according to the preferred embodiment of the present invention;

FIG. 4 is a schematic diagram illustrating that the pixels in two adjacent rows are scanned in contrast directions according to the preferred embodiment of the present invention;

FIG. 5A is a schematic diagram illustrating the result of a conventional halftoning process;

FIG. 5B is a schematic diagram illustrating the result of the halftoning process according to the preferred embodiment of the present invention;

FIG. 6A is a schematic diagram illustrating the process of sequence generating method according to the preferred embodiment of the present invention;

FIGS. 8A to 8E are schematic diagram illustrating detection of an object edge according to the preferred embodiment of the present invention;

DETAILED DESCRIPTION OF THE INVENTION

The present invention will be apparent from the following detailed description, which proceeds with reference to the accompanying drawings, wherein the same references relate to the same elements.

Figures 1, 2:
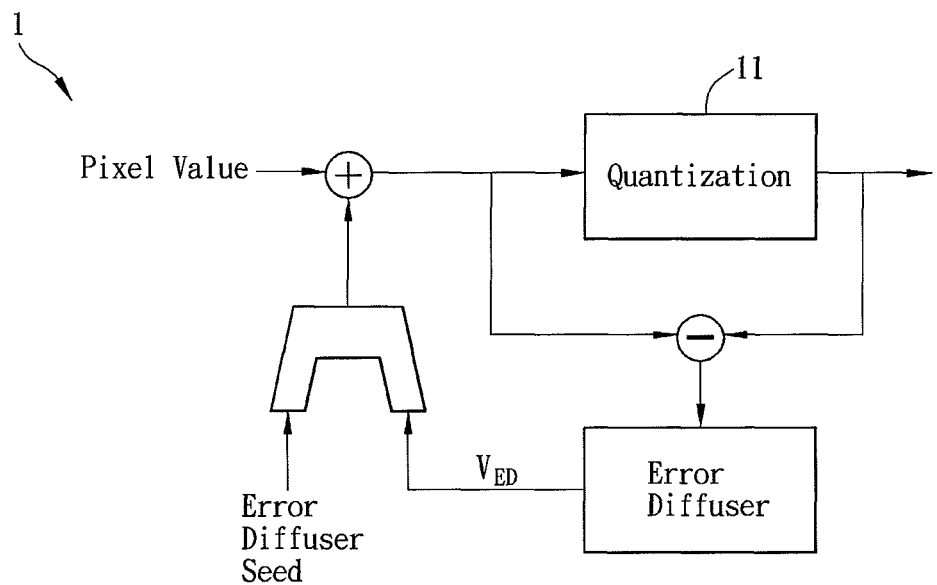
FIG. 1 is a block diagram illustrating a halftoning process according to a preferred embodiment of the present invention.
FIG. 2 is a schematic diagram illustrating the memory storing the error diffusion values according to the preferred embodiment of the present invention.

FIG. 1 is a block diagram of a halftoning process according to a preferred embodiment of the invention. In general, an image includes a plurality of pixel data which are located at different locations and respectively have pixel values. The pixel value represents color such as gray level or full color. These pixel values are processed in sequence thus transforming the original image into halftone image. The pixel values of the image are processed based on their positions in sequence. For example, the whole pixels are processed from top to bottom and from left to right; otherwise, two adjacent rows are scanned in opposite directions such as that the pixels in the two adjacent rows are respectively processed from left to right and from right to left.

The image can be in full color or gray level, and it is halftoned to output a processed image with lower resolution or less pixel bits.

The halftone process includes quantization and error diffusion. Each pixel value is processed to obtain an output pixel value with less bits by quantization.

For example, the input pixel value is transformed from m bits into n bits by quantization, wherein m>n. An error difference is generated by subtracting the output pixel value from the pixel value before quantization. Then the error diffusion value $V_{ED}$ is distributed based on the error difference to the residual unquantized pixel. These distributed values can be stored in a memory, and they are read from the memory when processing the corresponding pixel.

Before quantizing a pixel value of next pixel, the error diffusion is performed to distribute the error diffusion value $V_{ED}$ into the unprocessed pixel(s).

When processing the next pixel, the next pixel will be the current pixel while the just processed pixel is the "previous pixel". The following process includes steps of generating an error diffusion value, detecting an edge at a current pixel of the image, and adding the pixel value of the current pixel with one of the error diffusion value and an error diffusion seed according to the detecting result.

The generation of error diffusion value is a process that quantizes the pixel value of the unprocessed pixel of the image to output the quantized pixel value, then computes a difference value between the quantized pixel value and the pixel value of the unprocessed pixel, and uses a diffusion filter having distribution coefficients for generating the error diffusion value according to the difference value.

Because error diffusion is a pixel area consuming process (that leads to start delay), the proposed image process adapts to an object edge of the image by adding the error diffusion seed instead of the error diffusion value in order to enhance halftoning performance and improve start delay.

The pixel value of the current pixel may be added with the distributed error diffusion value $V_{ED}$ or an error diffusion seed. When an object edge within the image is detected, an error diffusion seed is added into the pixel value. When the edge is not detected, the pixel value of the current pixel is added with the error diffusion value.

The error diffusion seed is not generated by error diffusion, and it is generated by a random function or looking up from a table. The detail will be explained in the later embodiment.

Besides, in the embodiment, the diffusion filter may be a matrix proposed by Floyd-Steinberg as follow:

$$\frac{1}{16}\begin{bmatrix} - & - & - \\ - & * & 7 \\ 3 & 5 & 1 \end{bmatrix}.$$

Wherein, "*" represents the current pixel, "-" represents the previously processed pixels, and other numerals represent the distribution coefficient of the error diffusion value that the corresponding pixel should obtain.

In addition, the diffusion filter may be a matrix as follow:

$$\frac{1}{8}\begin{bmatrix} - & - & - & - & - \\ - & - & * & 3 & 1 \\ 0 & 2 & 2 & 0 & 0 \end{bmatrix}.$$

Wherein, "*" represents the current pixel, "-" represents the previously processed pixels, and other numerals represent the distribution coefficient of the error diffusion value that the corresponding pixel should obtain.

In this matrix, "3" locates at the same row and the next column of the current pixel, and its corresponding pixel will obtain $3/8$ of the total error diffusion value. "1" locates at the same row and next to the next column of the current pixel, and its corresponding pixel will obtain $1/8$ of the total error diffusion value. The two "2" locate at the next row and the previous and the same column of the current pixel, and their corresponding pixel will obtain $2/8$ of the total error diffusion value.

The distributed error diffusion value of each pixel is accumulated and stored in memory. For example, with reference to FIG. 2 and the following formula, the current pixel will obtain the sum $P_{i,j}$ of distributed error diffusion values. The sum $P_{i,j}$ of the distributed error diffusion values is stored in the memory.

$$P_{i,j}=V_{ED(i,j-1)}+V_{ED(i,j-2)}+V_{ED(i-1,j+1)}+V_{ED(i-1,j)}$$

This matrix benefits to improve the banding resulted from conventional error diffusion by Floyd-Steinberg method. Conventional method adds noise to improve the banding thus causing worse image quality. On the contrary, the proposed method eliminates the banding with the optimized error diffusion filter without noise addition, such that it looks no additional image artifacts.

This matrix benefits to improve the banding resulted from that a gray level ratio corresponding to the pixel value equals to a simple ratio. The gray level ratio represents a ratio of the gray level represented by the pixel value to the maximum gray level. The simple ratio, for example, is $1/4$, $1/3$, $1/2$, $2/3$, $3/4$ etc. Therefore, this diffusion filter has advantages of low cost and banding elimination.

The halftone process may also include performing gamma correction on the image data. For example, it performs gamma correction on the unquantized pixel value or the quantized pixel value of the image data. Gamma correction also helps improvement of the banding and makes tone of the image smooth.

Performing gamma correction with low gamma correcting parameter results in that the dark part of the image has smooth gray level variation, but it also causes that the image is whiter. Performing gamma correction with high gamma correcting parameter results in that the image can present dark black, but it also causes that the detail of the dark part of the image will be lost. Because the pixel value of halftone image has limited range to record gray level, gamma corrections of different color can be individually performed in order to present better image. For example, gamma corrections of red, green and blue are individually performed. The color independent gamma control on the halftoning gives better color matching of low gray bit reflective mode by the halftoning with high bit transmissive mode on transflective type MIP (memory in pixel) LCD device.

FIG. 3A shows a gamma correction table, and the corresponding gamma corrected value (GCV) is obtained by looking up this table with respect to the input pixel value (PV). The input pixel value (PV) is expressed by an integer from 0

(black) to 255 (white). The gamma corrected value is expressed by a decimal from 0 to 1. The looked-up pixel value is quantized and outputted as the quantized pixel value.

In addition, an intensity modification may be applied to the gamma corrected values of the gamma correction table. If the gamma corrected value is close to a ratio expressed by two simple integers, the gamma corrected value is modified based on this ratio.

Referring to FIG. 3B and FIG. 3C, the gamma correction and the intensity modification can be performed at the same time. In FIG. 3B, at least one gamma corrected value is equal to a ratio expressed by two simple integers. For example, when the input pixel value is 186 or 187 and the target gamma is 2.2, the corresponding gamma corrected value which is close to ½ is 0.4995 or 0.5054 in FIG. 3A. On the contrary, when the input pixel value is 186, the corresponding gamma corrected value which has been modified is 0.5 in FIG. 3B. In addition, as shown in FIG. 3C, three gamma corrected values are equal to a ratio expressed by two simple integer. For example, when the input pixel value is 185, 186, or 187, the corresponding gamma corrected value is 0.5. If the gamma corrected value is close to ¼, ⅓, ⅔, or ¾, the intensity modification may be also applied. The intensity modification can improve quality of halftone image, especially for the image with banding issue.

The "worm" is also the major image artifact of the conventional error diffusion method. This problem can be solved by scanning in contrast directions. For example, referring to FIG. 4, the pixels of the image according to the embodiment are processed from top to bottom, and two adjacent rows are scanned in opposite directions such as from left to right and from right to left in the two adjacent rows.

The halftone image processed by the above method is shown in FIG. 5B. FIG. 5A shows the halftone image processed by conventional error diffusion method. Comparing the two figures, the halftone image of FIG. 5B has improvement in start delay and worm.

In addition, the error diffusion seed may be generated before or after detecting an object edge of the image. The sequence of generating the error diffusion seed and detecting an object edge of the image is not limited.

The error diffusion seed is generated by a formula based on the pixel value and location of the current pixel and a random number. Or the error diffusion seed is generated by a formula based on the pixel value of the current pixel and a looked-up value, and the looked-up value is retrieved from a look-up table (LUT) according to the location of the current pixel. The LUT stores a plurality of the looked-up values.

For example, the function of error diffusion seed can be any of the following formulas:

$$\text{Err}=-0.5\text{Int}+0.25+|\text{rnd}(0.25)|\cos(\pi x) \quad (1)$$

Formula (1) can be represented by the following odd and even functions:

$$\text{Err}=-0.5\text{Int}+0.25+\text{rnd}(0.25) \text{ (when } x \text{ is odd)}$$

$$\text{Err}=-0.5\text{Int}+0.25-\text{rnd}(0.25) \text{ (when } x \text{ is even)} \quad (2)$$

Wherein, Err is an error diffusion seed, Int is the pixel value of the current pixel, the range of Int is from 0 to 1, x represents the location of the current pixel, and rnd( ) is a random function.

In addition, the error diffusion seed can be generated based on formula (3).

$$\text{Err}=-\text{Int}+0.375+|\text{rnd}(\text{int}/2+0.125)|\cos(\pi x)$$
$$(0 \le \text{int} < 0.25)$$

$$\text{Err}=-0.5\text{Int}+0.25+|\text{rnd}(0.25)|\cos(\pi x) \; (0.25 \le \text{int} \le 0.75)$$

$$\text{Err}=-\text{Int}+0.625+|\text{rnd}((1-\text{int})/2+0.125)|\cos(\pi x)$$
$$(0.75 < \text{int} \le 1) \quad (3)$$

Wherein, Err is an error diffusion seed, Int is the pixel value of the current pixel, the range of Int is from 0 to 1, x represents the location of the current pixel, and rnd( ) is a random function. Formula (1) and formula (3) are functions of the pixel value and location of the current pixel and the absolute value of a random number.

Besides, the error diffusion seed can be generated based on formula (4) and a LUT.

$$\text{Err}=-0.5\text{Int}+0.25+0.25\text{LUT}(x)/2^k \quad (4)$$

Wherein, Err is an error diffusion seed, Int is the pixel value of the current pixel, the range of Int is from 0 to 1, x represents the location of the current pixel, LUT(x) is a looked-up value according to x from a look-up table, and k=4.

Referring to FIG. 6A, the look-up table is generated by a sequence generating method. The sequence generating method includes of following steps:

Step 1-1: generating a first sequence and a second sequence according to a base sequence.

Step 1-2: combining the first sequence and the second sequence to generate a combined sequence.

Step 1-3: taking the combined sequence as the base sequence.

Step 1-4: repeating the step 1-1 to 1-3 until the element amount of the combined sequence reaches a predetermined amount.

Step 1-5: adding each element of the combined sequence with a value.

For example, assuming the base sequence is {0}, the first sequence and the second sequence are generated according to the following formula.

$$M_0=\{0\}$$

For $k=1$ to 4

$$M_a=2*M_{k-1}+0$$

$$M_b=2*M_{k-1}+1$$

$$M_k=(M_a,M_b) \quad (5)$$

Each element of base sequence $M_k$ is multiplied by 2 to generate the first sequence $M_a$. Each element of base sequence $M_k$ is multiplied by 2 and added with 1 to generate the second sequence $M_b$.

The front of the second sequence $M_b$ is appended to the end of the first sequence $M_a$ to generate the combined sequence. The element quantity of the combined sequence is twice of that of first sequence $M_a$ or the second sequence $M_b$.

When the element quantity of the combined sequence reaches a predetermined quantity, each element of the combined sequence is added with a number. Then a symmetrical sequence is generated according to the combined sequence. Finally, the combined sequence and the symmetrical sequence are combined to generate a reference sequence, and each elements of the reference sequence is taken as the looked-up values of the look-up table.

Figure 6B:
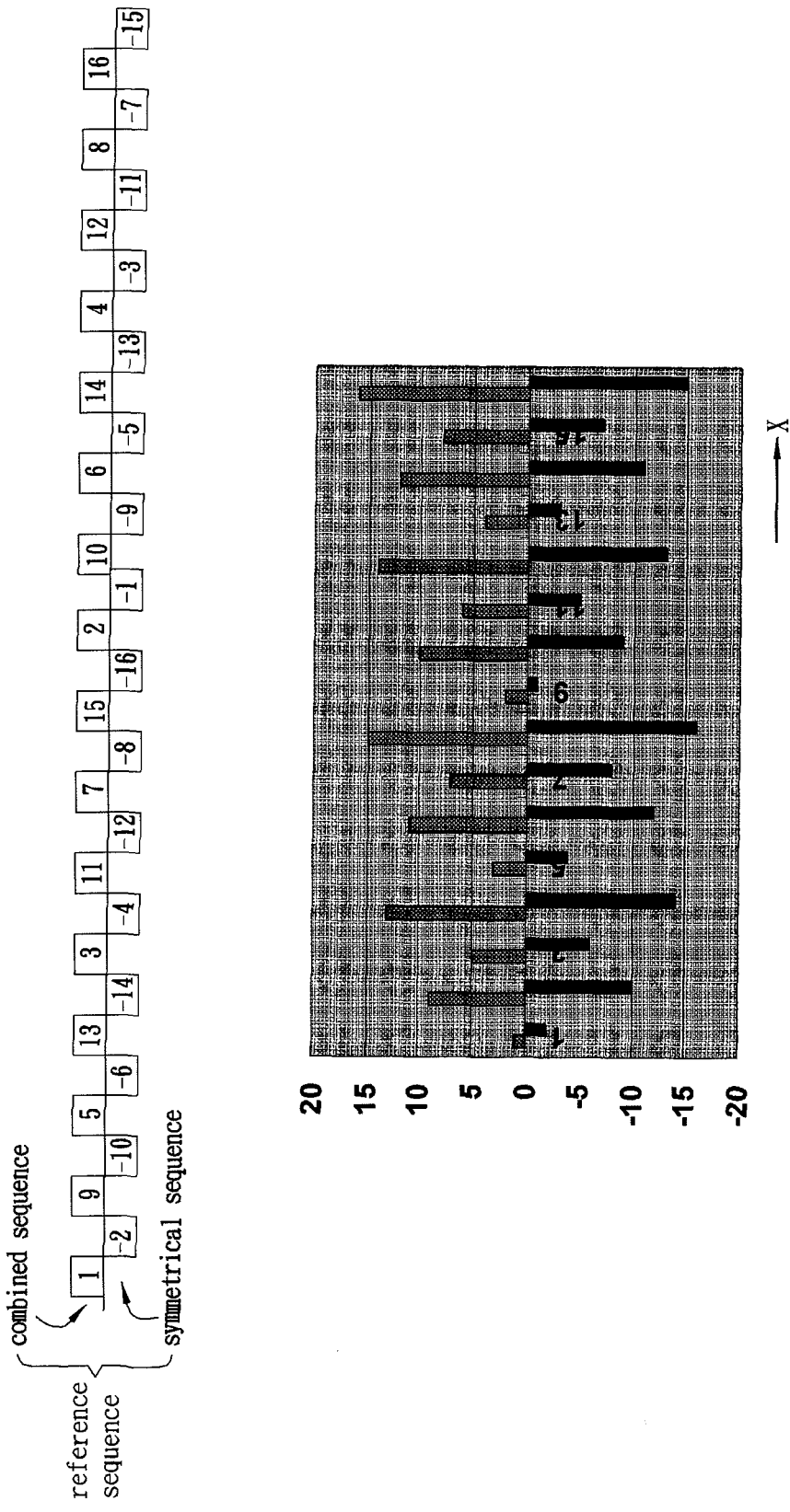
FIGS. 6B and 6C are schematic diagrams illustrating the reference sequences according to the preferred embodiment of the present invention.

For example, assuming repeating time is 4 or the predetermined quantity is 16, the base sequence, the first sequence, the second sequence and the combined sequence are shown in FIG. 6A. The symmetrical sequence and the reference sequence are shown in FIG. 6B or FIG. 6C.

Referring to FIG. 6B, the elements of the front part of the combined sequence are multiplied by −1 to generate the rear part of the symmetrical sequence. The elements of the rear part of the combined sequence are multiplied by −1 to generate the front part of the symmetrical sequence.

Figure 6C:
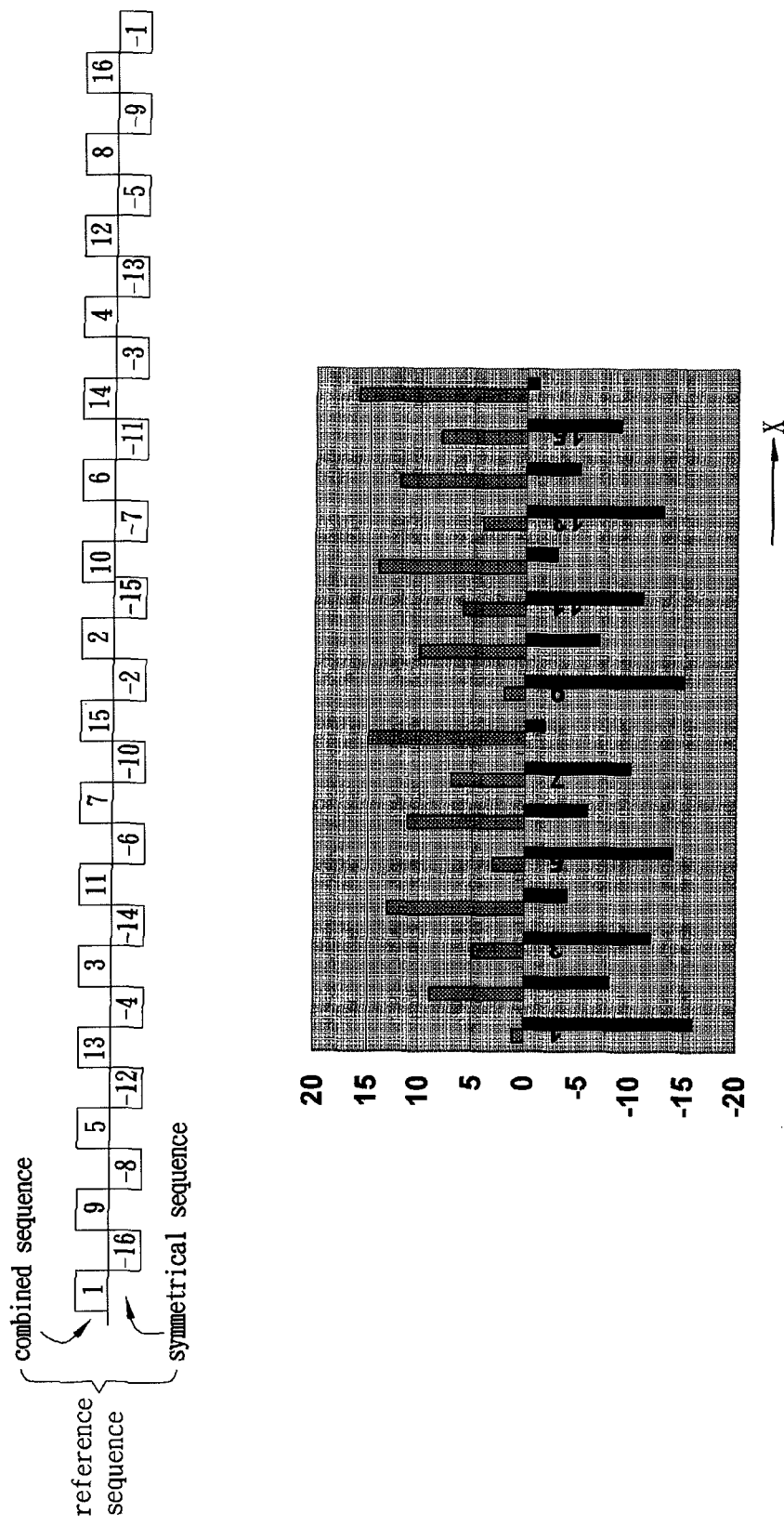

Referring to FIG. 6C, the elements of the combined sequence are multiplied by −1 and the element order is inversed to generate the symmetrical sequence.

Figure 7A:
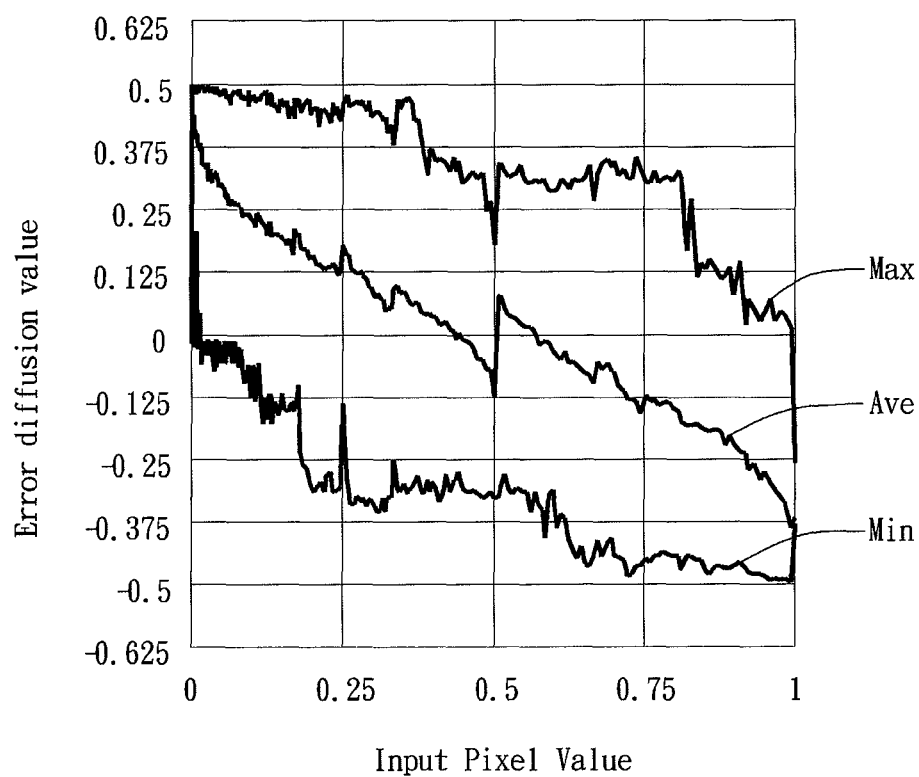
FIG. 7A is a schematic diagram illustrating the relation between the input pixel value and the range of the error diffusion value according to the preferred embodiment of the present invention.

FIG. 7A shows an analysis of relation between the input pixel value and the range of the error diffusion values according to a plurality of test images processed by the method described above. In the left-top portion of FIG. 7A, the pixel values are low and the error diffusion value is positive. In the right-bottom portion of FIG. 7A, the pixel values are high and the error diffusion value is negative. Low pixel value indicates the pixel is dark, and high pixel value indicates the pixel is bright.

The range of the error diffusion values presents a band, the upper limit is the maximum of the error diffusion value, and the lower limit is the minimum of the error diffusion value. The band is stretched from the left-top portion to the right-bottom portion.

Figure 7B:
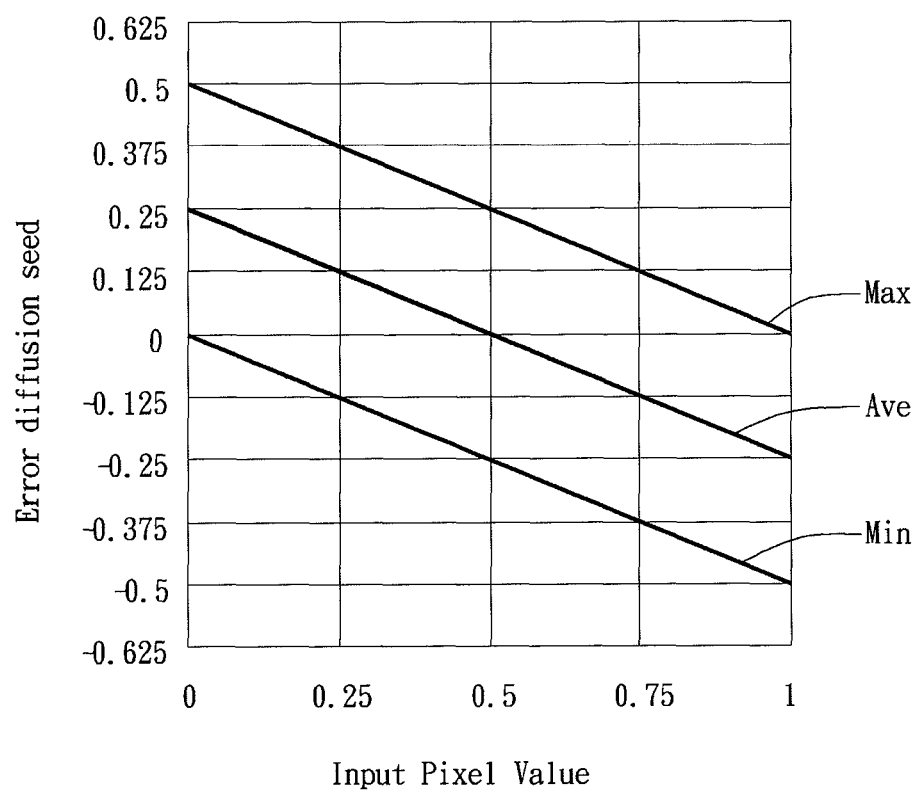
FIGS. 7B to 7D are schematic diagrams illustrating the relation between the input pixel value and the range of the error diffusion seed according to the preferred embodiment of the present invention.
Figure 7C:
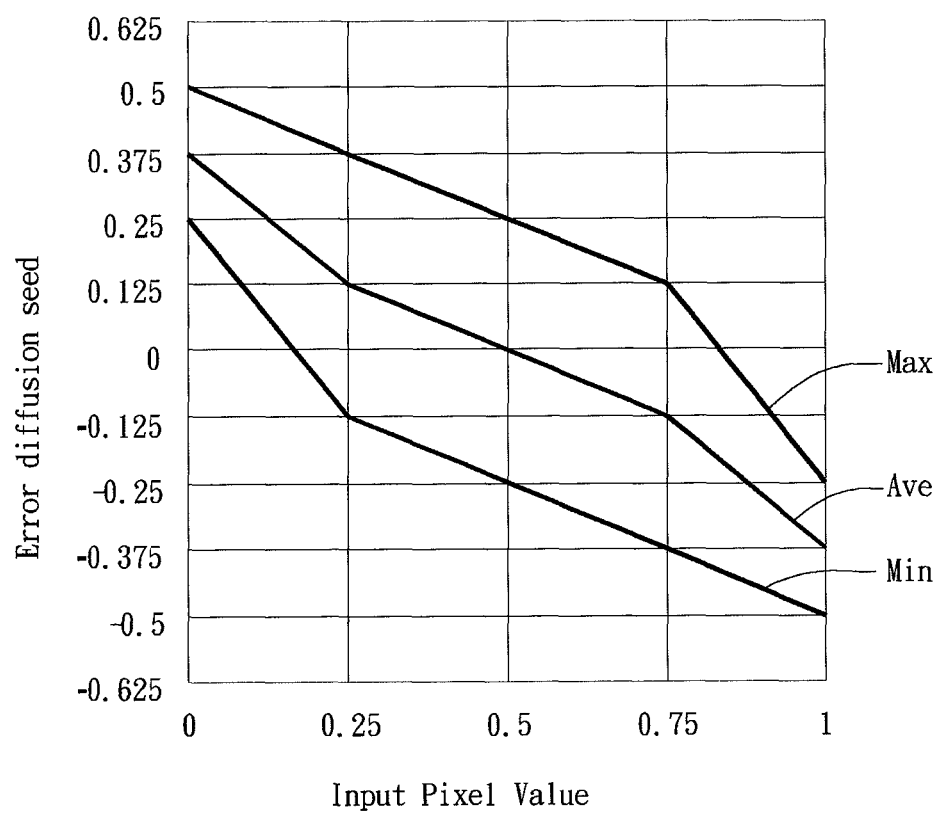
Figure 7D:
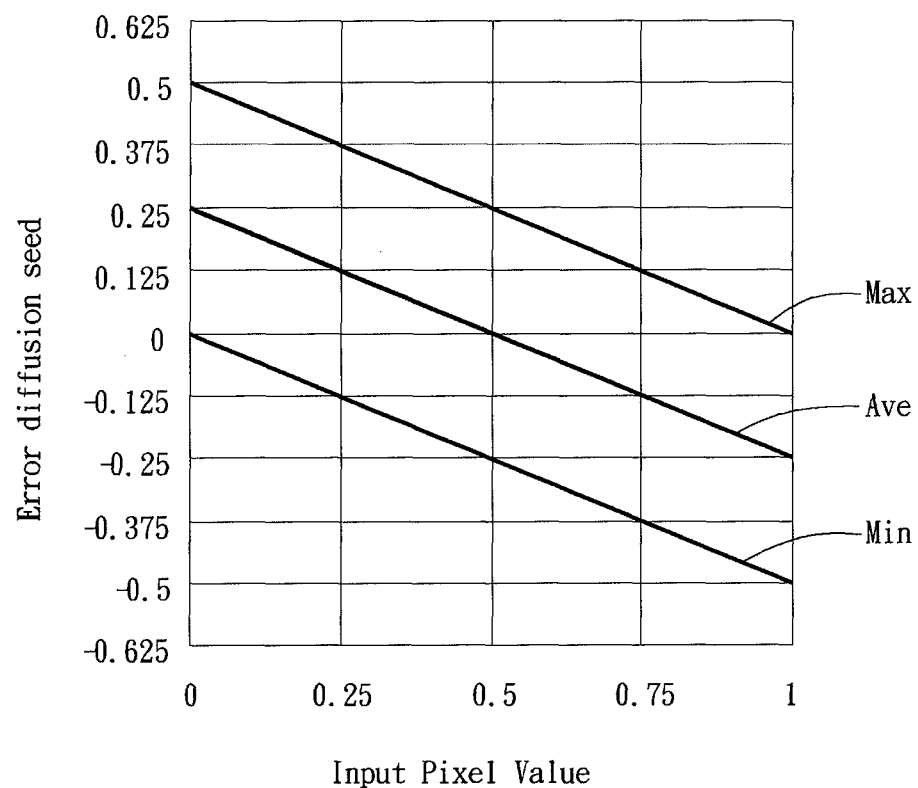

Referring to FIGS. 7B to 7D, the range of the error diffusion seed is within that of the error diffusion value, such that the image quality will not be inferior after adding the pixel value with the error diffusion seed. Furthermore, the image quality may be improved.

For example, the error diffusion seed shown in FIG. 7B may be generated by the above formula (1) or (2). The error diffusion seed shown in FIG. 7C may be generated by the above formula (3). The error diffusion seed shown in FIG. 7D may be generated by the above formula (4).

Referring to FIG. 7C, the range of the error diffusion seed correspond to the limit of the pixel value is narrower than the range of the error diffusion seed correspond to the mid of the pixel value. The limit of the pixel value is the maximum or minimum of the pixel value. The limit of the error diffusion seed can improve start delay more effectively.

Figures 8A, 8B, 8C, 8D, 8E:
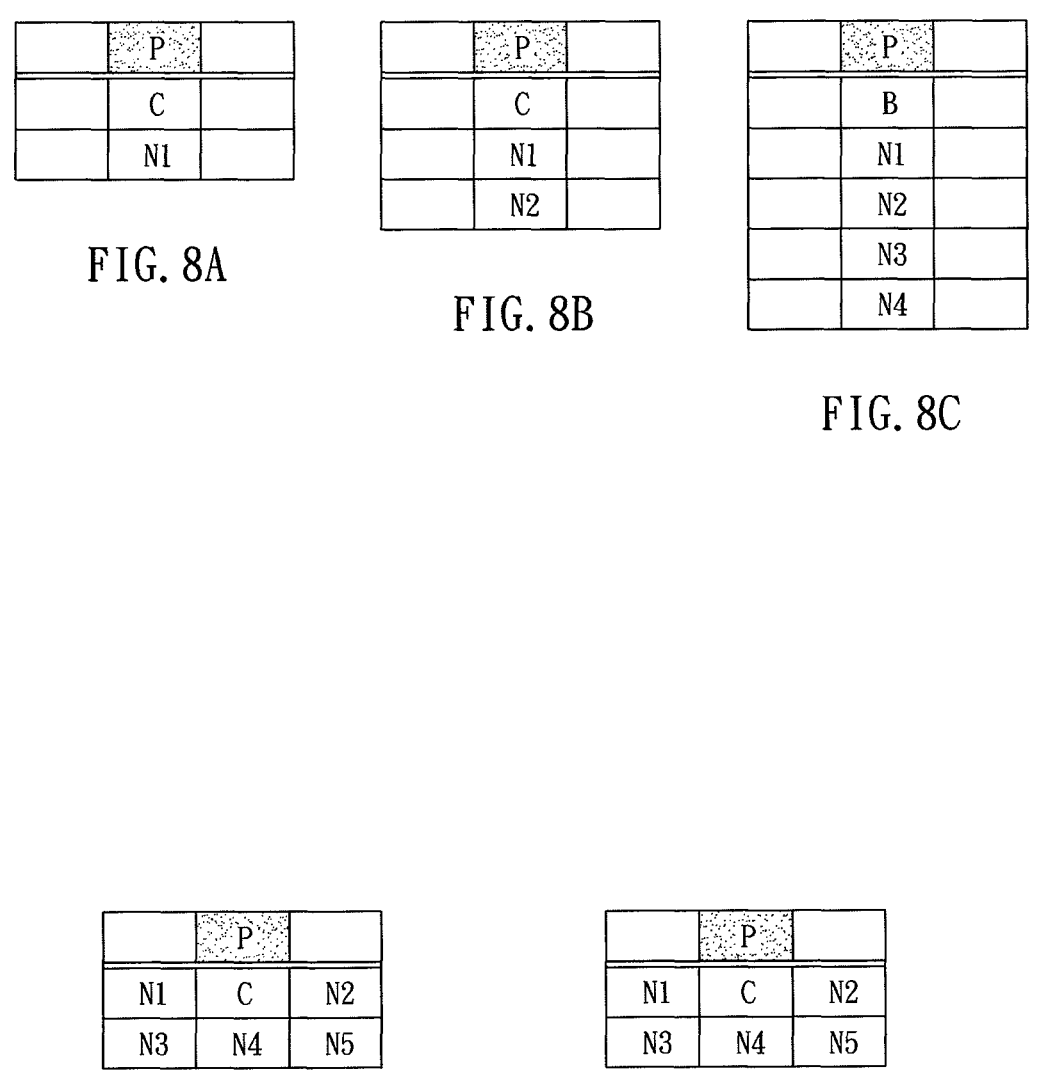

The detection of an object edge is illustrated in FIG. 8A to FIG. 8E. For example, the pixels are processed from top to bottom. "P" represents the previously processed pixel, "C" represents the currently processed pixel. In FIGS. 8A-8C, "$N_1$~$N_4$" represents the unprocessed pixel at the same column of the current pixel. In FIGS. 8D-8E, "$N_1$~$N_5$" represents the unprocessed pixel at the same row or next row of the current pixel.

Referring to FIG. 8A to FIG. 8C, the detecting the edge includes the following steps:

Step 2-1: determining that the pixel value of the current pixel C is not the same with that of the previous pixel P, and then entering step 2-2 if the determination of step 2-1 is true.

Step 2-2: determining that the pixel values of the current pixel C and at least one unprocessed pixel connected with the current pixel in the same column are the same.

Wherein, FIG. 8A shows one unprocessed pixel $N_1$ connected with the current pixel in the same column, and FIG. 8B and FIG. 8C show two unprocessed pixels $N_1$ to $N_2$ and four unprocessed pixels $N_1$ to $N_4$ connected with the current pixel in the same column.

If the determination of step 2-2 is true, an edge is found. For example, referring FIG. 8A, if the pixel value of the current pixel C is not the same with that of the previous pixel P, and the pixel values of the current pixel C and the unprocessed pixel $N_1$ are the same, an edge is found. The determinations of FIGS. 8B and 8C is similar to that of FIG. 8A, so the detail description is omitted.

Referring to FIG. 8D, the detecting the edge includes the following steps:

Step 3-1: determining that the pixel value of the current pixel C is not the same with that of the previous pixel P; and Step 3-2: determining that all unprocessed pixels $N_1$ to $N_5$ neighboring with the current pixel have the same pixel values.

Referring to FIG. 8E, the detecting the edge includes the following steps:

Step 4-1: determining that the pixel value of the current pixel C is not the same with that of the previous pixel P; and Step 4-2: determining that at least four pixels among unprocessed pixels $N_1$ to $N_5$ neighboring with the current pixel have the same pixel values.

The detecting of FIG. 8A is simple and fast, but it causes less image quality. The detecting of FIGS. 8C, 8D and 8E results in better image quality, but FIG. 8C is time consuming and requires complicated hardware or software. So, the detection of FIG. 8D or 8E is the best compromise.

Figure 9:
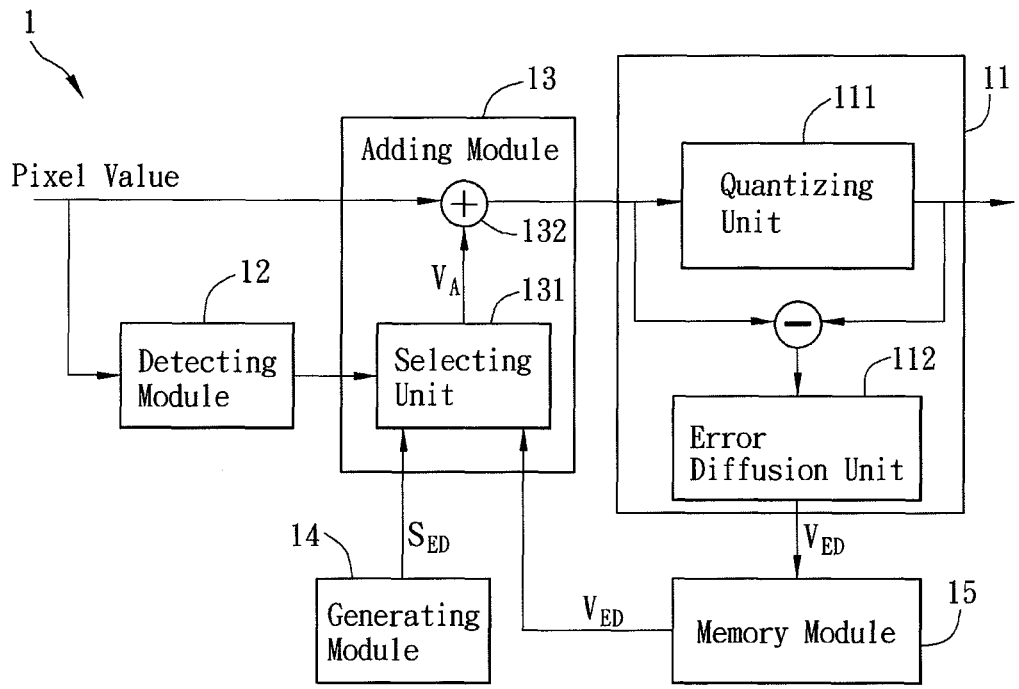
FIG. 9 is a block diagram illustrating an image process device according to another preferred embodiment of the present invention.

Referring to FIG. 9, an image processing device 1 includes a halftoning module 11, a detecting module 12, an adding module 13, a generating module 14 and a memory module 15. The halftoning module 11 halftones pixel value of the current pixel to output a quantized value and an error diffusion value $V_{ED}$. The detecting module 12 detects an edge at a current pixel of the image. The adding module 13 adds the pixel value of the current pixel with one of the error diffusion value $V_{ED}$ and an error diffusion seed $S_{ED}$ according to the detection. When processing the next pixel, the next pixel will be the current pixel. The error diffusion value $V_{ED}$ has been generated according to the pixel value of the previously processed pixel of the image by the halftoning module 11, wherein the current pixel and the previously processed pixel are at the same frame or same image.

The error diffusion values $V_{ED}$ are stored in the memory module 15 and then read when processing corresponding pixel. For example, the memory module 15 saves the sum of the error diffusion values $V_{ED}$ which are corresponding to the same pixel and generated based on different previously quantized pixel value.

The halftoning module 11 comprises a quantizing unit 111 and an error diffusion unit 112. The quantizing unit 111 quantizes the pixel value of the image to output the quantized value. The error diffusion unit 112 generates the error diffusion value $V_{ED}$ according to the difference value between the pixel value and the quantized value by a diffusion filter.

For example, each pixel values are processed by the quantizing unit 111 in sequence. Before quantizing, the pixel value is added with the error diffusion value $V_{ED}$ or error diffusion seed $S_{ED}$ and then quantized.

The detecting module 12 detects the edge by computing the difference of the current pixel and the previous pixel. Because the detail of detecting the edge is described above, it is omitted here.

The adding module 13 comprises a selecting unit 131 and an adding unit 132. The selecting unit 131 selects the error diffusion seed $S_{ED}$ or the error diffusion value $V_{ED}$ as an adding value $V_A$. The adding unit 132 adds current pixel value with the adding value $V_A$. The selecting unit 131 selects the error diffusion seed $S_{ED}$ as the adding value $V_A$ when the edge is detected, or selects the error diffusion value $V_{ED}$ as the adding value $V_A$ when the edge is not detected.

Figure 10:
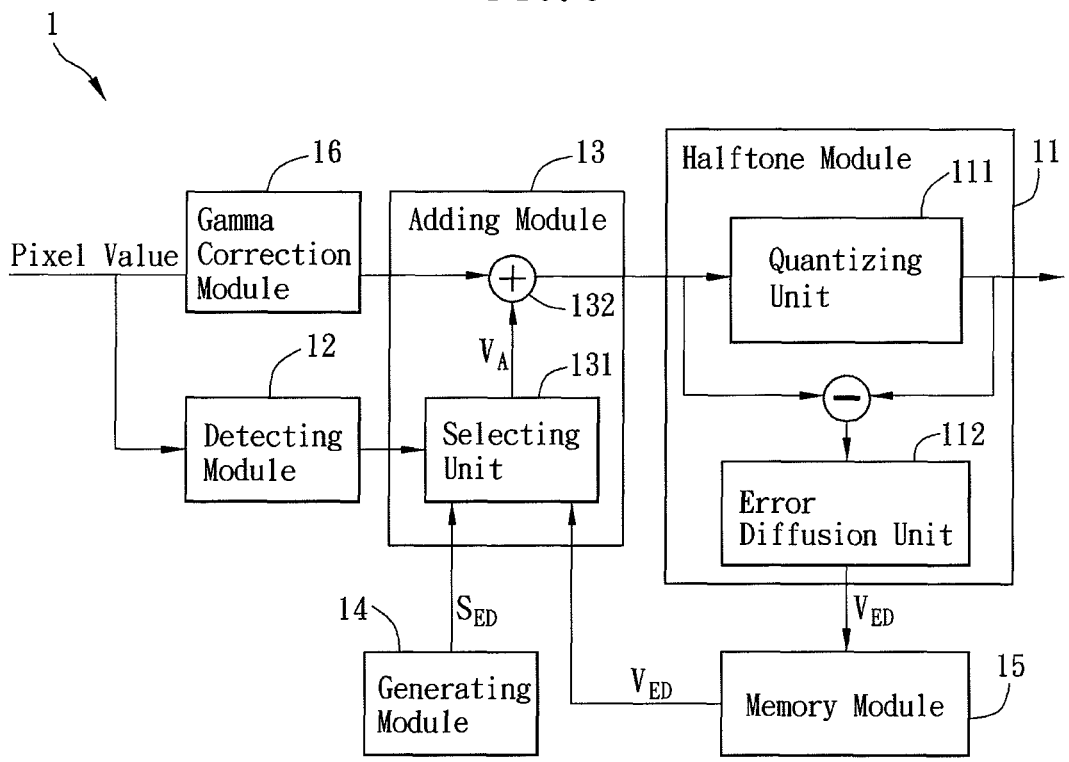
FIG. 10 is a block diagram illustrating a display device according to another preferred embodiment of the present invention.

In addition, referring to FIG. 10, the processing device 1 has a gamma correction module 16 to perform gamma correction on the current pixel value. After being performed gamma correction, the current pixel value is quantized by the quantizing unit 111.

Moreover, in another embodiment, the detecting module 12 detects an edge according to the pixel values which are performed with gamma correction.

Figure 11:
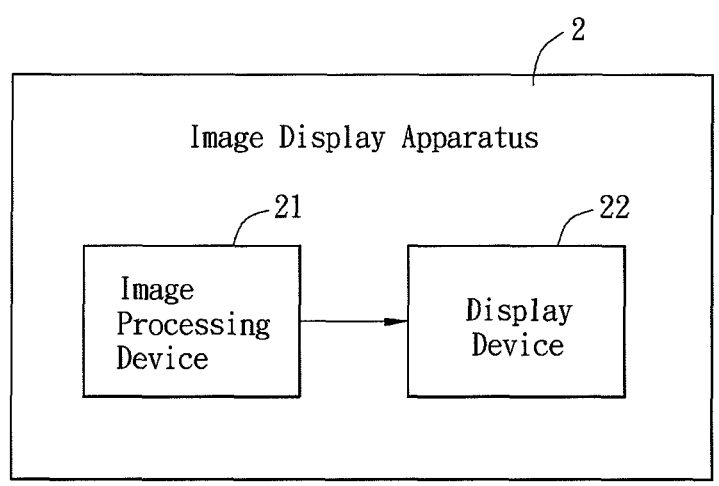
FIG. 11 is a block diagram illustrating an image display apparatus according to another preferred embodiment of the present invention.

Referring to FIG. 11, an image display apparatus 2 includes an image processing device 21 and a display device 22. The image processing device 21 is similar with the image processing device 1 described above, it has a halftoning module, a detecting module, an adding module, a generating module and a memory module. The display device 22 displays the image processed by the image processing device 21.

For example, the display device 22 is an LCD panel such as a low bit MIP LCD device having a plurality of pixel areas, and each of the pixel areas has a memory. The low bit MIP LCD device shows black & white (1 bit) or 4 level gray (2bit) for each R, G & B sub-pixel on the screen.

The image display apparatus 2 has two display modes. One mode is a normal mode, which indicates that the display device 22 displays image according to pixel values in standard format. The other mode is halftone mode, which indicates that the display device 22 displays image according to pixel values applied with the image process described above.

The halftone mode is suitable for MIP (memory in pixel). In this mode, pixel values are stored in the memory in pixel, and the column driver does not need to repeat writing image data into the pixels. Therefore, power consuming is reduced.

In addition, the display device 22 may be transmitting type LCD panel, reflective type LCD panel or transflective type LCD panel.

For example, the display device 22 is transflective type LCD panel which has transmitting mode and reflective mode. The display device 22 may display image in normal mode and transmitting mode, or the display device 22 may display image in halftone mode and reflective mode.

To sum up, the pixel value may be added with an error diffusion value generated by the error diffusion or added with an error diffusion seed generated by other methods. Therefore, it can generate the halftoned image with better image quality.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An image processing device, comprising:
   a halftoning module for generating an error diffusion value;
   a detecting module for detecting an edge at a current pixel of an image; and
   an adding module for adding the pixel value of the current pixel with one of the error diffusion value and an error diffusion seed according to a detecting result,
   wherein the detecting module determines that the pixel value of the current pixel is not the same with that of a previous pixel, and determines that the pixel values of the current pixel and at least one unprocessed pixel connected with the current pixel in the same column are the same, or the detecting module determines that the pixel value of the current pixel is not the same with that of the previous pixel, and determines that at least four pixels among unprocessed pixels neighboring with the current pixel have the same pixel values.

2. The image processing device according to claim 1, wherein the adding module comprises:
   a selecting unit for selecting the error diffusion seed or the error diffusion value as an adding value; and
   an adding unit for adding the pixel value of the current pixel with the adding value,
   wherein the selecting unit selects the error diffusion seed as the adding value when the edge is detected, or selects the error diffusion value as the adding value when the edge is not detected.

3. The image processing device according to claim 1, wherein the halftoning module comprises:
   a quantizing unit for quantizing a pixel value of a previous pixel of the image to output a quantized pixel value; and
   a diffusion unit using a diffusion filter to generate the error diffusion value according to the difference value of the unprocessed pixel value and the quantized pixel value, wherein the diffusion filter is a matrix of $$\frac{1}{8}\begin{bmatrix} - & - & - & - & - \\ - & - & * & 3 & 1 \\ 0 & 2 & 2 & 0 & 0 \end{bmatrix}.$$

4. The image processing device according to claim 1 further comprising:
   a generating module for generating the error diffusion seed by a formula based on the pixel value and location of the current pixel and a random number.

5. The image processing device according to claim 1 further comprising:
   a generating module for generating the error diffusion seed by a formula based on the pixel value of the current pixel and a looked-up value, wherein the looked-up value is retrieved from a look-up table according to the location of the current pixel.

6. The image processing device according to claim 1 further comprising:
   a gamma correction module for performing gamma correction on the current pixel, wherein a gamma corrected pixel value is represented by a simple ratio, and the simple ratio is ¼, ⅓, ½, ⅔, or ¾.

7. A display apparatus, comprising:
   a processing device for an image comprising:
   a halftoning module for generating an error diffusion value,
   a detecting module for detecting an edge at a current pixel of the image, and
   an adding module for adding the pixel value of the current pixel with one of the error diffusion value and an error diffusion seed according to a detecting result; and
   a displaying device for displaying the image processed by the processing device,
   wherein the detecting module determines that the pixel value of the current pixel is not the same with that of a previous pixel, and determines that the pixel values of the current pixel and at least one unprocessed pixel connected with the current pixel in the same column are the same, or the detecting module determines that the pixel value of the current pixel is not the same with that of the previous pixel, and determines that at least four pixels among unprocessed pixels neighboring with the current pixel have the same pixel values.

8. The display apparatus according to claim 7, wherein the displaying device is an active matrix liquid crystal display device having a plurality of pixel areas, and each of the pixel areas has a memory.

9. An image processing device, comprising:
- a halftoning module for generating an error diffusion value;
- a detecting module for detecting an edge at a current pixel of an image;
- an adding module for adding the pixel value of the current pixel with one of the error diffusion value and an error diffusion seed according to the detecting result; and
- a generating module for generating the error diffusion seed,
- wherein the error diffusion seed is generated by a formula based on the pixel value and location of the current pixel and a random number, or the error diffusion seed is generated by a formula based on the pixel value of the current pixel and a looked-up value, and the looked-up value is retrieved from a look-up table according to the location of the current pixel.

10. The image processing device according to claim 9, wherein the adding module comprises:
- a selecting unit for selecting the error diffusion seed or the error diffusion value as an adding value; and
- an adding unit for adding the pixel value of the current pixel with the adding value,
- wherein the selecting unit selects the error diffusion seed as the adding value when the edge is detected, or selects the error diffusion value as the adding value when the edge is not detected.

11. The image processing device according to claim 9, wherein the halftoning module comprises:
- a quantizing unit for quantizing a pixel value of a previous pixel of the image to output a quantized pixel value; and
- a diffusion unit using a diffusion filter to generate the error diffusion value according to the difference value of the unprocessed pixel value and the quantized pixel value, wherein the diffusion filter is a matrix of $$\frac{1}{8}\begin{bmatrix} - & - & - & - & - \\ - & - & * & 3 & 1 \\ 0 & 2 & 2 & 0 & 0 \end{bmatrix}.$$

12. The image processing device according to claim 9, wherein the detecting module determines that the pixel value of the current pixel is not the same with that of a previous pixel, and determines that the pixel values of the current pixel and at least one unprocessed pixel connected with the current pixel in the same column are the same.

13. The image processing device according to claim 9, wherein the detecting module determines that the pixel value of the current pixel is not the same with that of the previous pixel, and determines that at least four pixels among unprocessed pixels neighboring with the current pixel have the same pixel values.

14. The image processing device according to claim 9, wherein the range of the error diffusion seed is within that of the error diffusion value.

15. The image processing device according to claim 14, wherein the range of the error diffusion seed correspond to the limit of the pixel value is narrower than the range of the error diffusion seed correspond to the mid of the pixel value.

16. The image processing device according to claim 9 further comprising:
- a gamma correction module for performing gamma correction on the current pixel, wherein a gamma corrected pixel value is represented by a simple ratio, and the simple ratio is ¼, ⅓, ½, ⅔, or ¾.

* * * * *